United States Patent
Kuzior et al.

(10) Patent No.: US 10,579,446 B2
(45) Date of Patent: Mar. 3, 2020

(54) PER-REQUEST EVENT DETECTION TO IMPROVE REQUEST-RESPONSE LATENCY

(71) Applicant: Microsoft Technology Licensing, LLC, Redmond, WA (US)

(72) Inventors: Matthew Christopher Kuzior, Redmond, WA (US); Harsh Satyanarayan Dangayach, Sammamish, WA (US); Alexander Lawrence Wilkins, Bothell, WA (US); Matthew John Smith, Johnston, IA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/952,849

(22) Filed: Apr. 13, 2018

(65) Prior Publication Data
US 2019/0317836 A1  Oct. 17, 2019

(51) Int. Cl.
*G06F 9/54* (2006.01)
*G06F 9/48* (2006.01)
*H04L 29/08* (2006.01)
*H04L 29/06* (2006.01)

(52) U.S. Cl.
CPC ........... *G06F 9/542* (2013.01); *G06F 9/485* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,108,700 A | 8/2000 | Maccabee et al. |
| 7,051,339 B2 | 5/2006 | Deverill et al. |
| 7,908,160 B2 | 3/2011 | Bhargava |
| 8,495,652 B2 | 7/2013 | Horikawa |
| 8,930,533 B2 | 1/2015 | Wiener et al. |
| 9,514,006 B1 | 12/2016 | Busaba et al. |
| 2006/0074970 A1 | 4/2006 | Narayanan et al. |
| 2014/0109096 A1* | 4/2014 | Chandhoke |
| 2014/0173359 A1* | 6/2014 | Basava |
| 2016/0196164 A1* | 7/2016 | Lin |

OTHER PUBLICATIONS

"Appdynamics: End-to-End Latency Performance", Retrieved From <<https://docs.appdynamics.com/display/PRO43/End-to-End+Latency+Performance>>, Retrieved on: Mar. 7, 2018, 2 Pages.

* cited by examiner

*Primary Examiner* — Syed A Roni
(74) *Attorney, Agent, or Firm* — Christopher J. Volkmann; Kelly, Holt & Christenson, PLLC

(57) ABSTRACT

Events are raised by a worker thread that is executing a workflow, when the worker thread starts, suspends, resumes and ends execution of the workflow. A latency detection system, that is external to the worker thread, detects when these events are raised and logs a timestamp and a stack trace, corresponding to the workflow and the event that was raised.

19 Claims, 12 Drawing Sheets

PER-REQUEST EVENT DETECTION TO IMPROVE REQUEST-RESPONSE LATENCY

BACKGROUND

Computing systems are currently in wide use. Some computing systems are server computing systems which host services that can be accessed by client computing systems. By way of example, a client computing system may generate a request and send it to the server computing system. The server computing system may then receive the request and execute a plurality of different workflows in responding to the request. Each workflow may include a plurality of different tasks, that are to be executed in order, to execute the workflow.

Each of these types of requests has an associated latency. The latency corresponds to the time it takes from receiving the request until providing a response to the request. The latency can be dependent on a wide variety of different factors. Each of the different workflows executed in responding to a request may have its own latency, and those individual latencies may vary widely. Similarly, there may be multiple instances of a same workflow that are being executed concurrently.

Therefore, it can be very difficult to identify and reduce the sources of latency in a service computing system. This can be exacerbated due to the large volume of activities and limited access to the computing resources that are available to monitor latency.

In addition, there may be certain events that greatly contribute to the latency, but they may be relatively rare. Therefore, manual attempts to reproduce the workflows and events that may occur in a server computing system, and to collect stack trace information, may be extremely difficult.

To address these issues, some current computing systems will identify, over a predetermined interval, which processes are consuming most of the active work cycles of the computing system. However, it is not uncommon for the execution of processes to be suspended, because they may be waiting on the execution of other processes. These types of suspended time intervals can be very difficult to identify.

For instance, assume that process A begins executing and is then suspended because it is waiting for process B to complete work before it is able to continue. Even though process A is not doing work during the time that it is suspended, current attempts to capture latency will attribute the suspended time to the latency of process A, even though it is not process A that is actually contributing to the latency.

Other attempts have been made to log timestamps at certain points during execution. This can help to surface time spent waiting, but the code needed to log a timestamp must then be inserted manually at the specific points, in every workflow where it is desired, and it must be associated with enough information to be able to tell which particular part of the workflow was being executed at that point. If this technique is expanded to accommodate other parts of the same workflow or additional workflows, this means that the timestamping code must be added at even more spots in the workflows. This can be cumbersome and error prone.

The discussion above is merely provided for general background information and is not intended to be used as an aid in determining the scope of the claimed subject matter.

SUMMARY

Events are raised by a worker thread that is executing a workflow, when the worker thread starts, suspends, resumes and ends execution of the workflow. A latency detection system, that is external to the worker thread, detects when these events are raised and logs a timestamp and a stack trace, corresponding to the workflow and the event that was raised.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
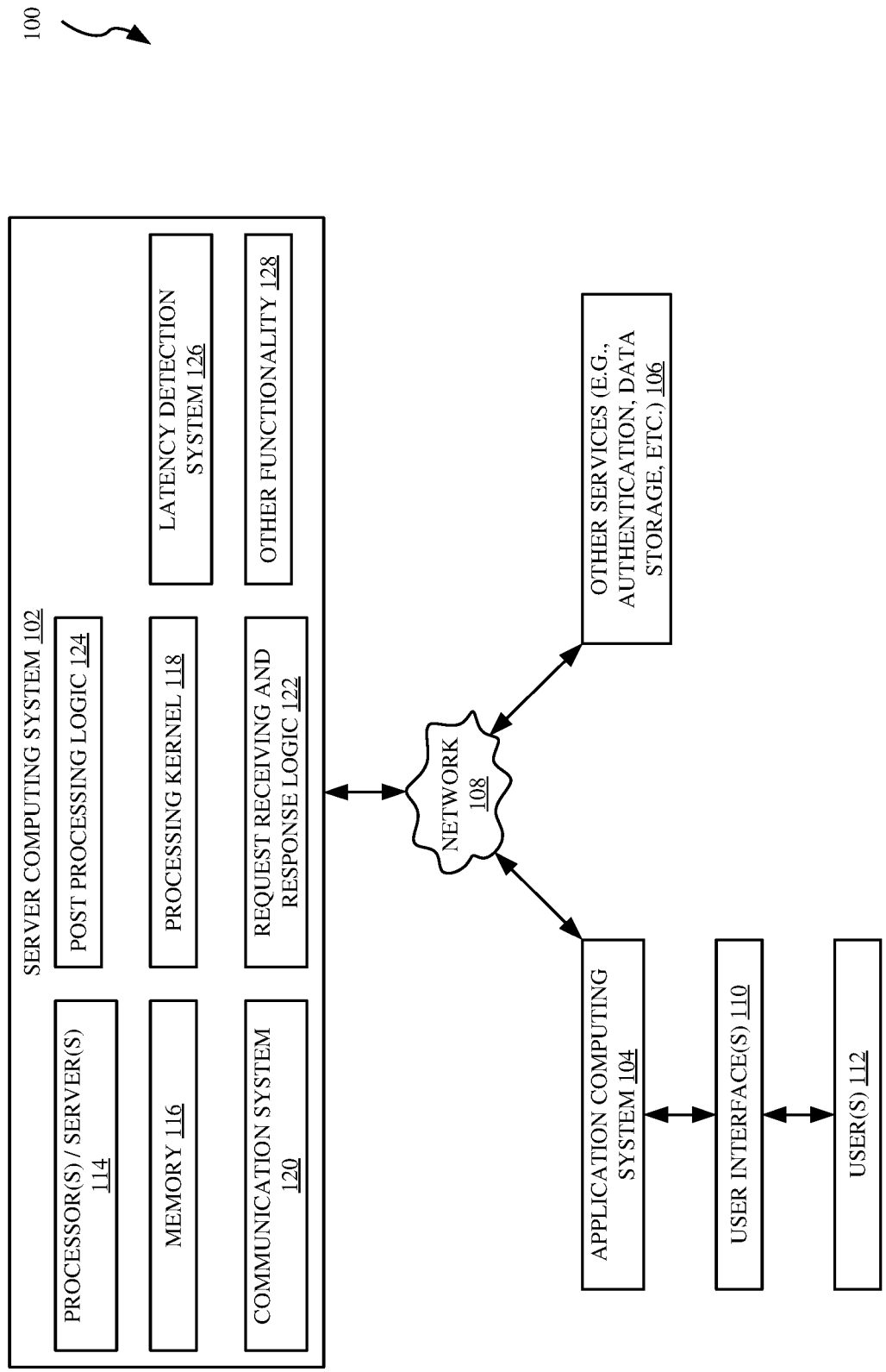
FIG. 1 is a block diagram of one example of a computing system architecture.

FIG. 1 is a block diagram of one example of a computing system architecture 100. Architecture 100 shows server computing system 102 connected to an application computing system 104 (such as a client computing system) and to one or more other services or service computing systems 106, over network 108. Network 108 is illustratively a wide area network, a local area network, a near field communication network, a cellular communication network, or any of a wide variety of other networks or combinations of networks.

Server computing system 102 illustratively hosts a service that can be accessed by application computing system 104. Other services 106 may be services which are accessed by server computing system 102 in providing its hosted service, or by application computing system 104. For instance, other services 106 may be authentication services, data storage services, etc., which service computing system 102 will access in responding to requests for its service from application computing system 104.

FIG. 1 also shows that, in the example illustrated in FIG. 1, application computing system 104 can generate one or more user interfaces 110 for interaction by one or more users 112. Users 112 illustratively interact with user interfaces 110 in order to control and manipulate application computing system 104 and some portions of server computing system 102.

Also, in the example shown in FIG. 1, server computing system 102 illustratively includes one or more processors or servers 114, memory 116, one or more processing kernels 118, communication system 120, request receiving and response logic 122, post processing logic 124, latency detection system 126, and it can include a wide variety of other functionality 128. Before describing the overall operation of architecture 100 in more detail, a brief overview of some of the items in architecture 100, and their operation, will first be provided.

Memory 116 illustratively stores information that can be used and maintained by processing kernel 118 in performing workflows. Communication system 120 illustratively allows components of server computing system 102 to communicate with one another, and to communicate with other items over network 108. Request receiving and response logic 122 illustratively receives a request for service from application computing system 104 over network 108. It assigns that request a request identifier and identifies certain workflows that will be run in responding to the request. It can interact with processing kernel 118 in order to instantiate those workflows and to receive the result of those workflows. It then illustratively provides a response back to application computing system 104, in response to the request. Latency detection system 126 illustratively detects events that are raised by worker threads in processing kernel 118, as is described in greater detail below, and detects latency associated with various parts of the different workflows that are being executed. It can aggregate that latency information and sort it based on a wide variety of different types of filter criteria that can be used to filter the data. Post processing logic 124 illustratively accesses the aggregated latency data and filters it, as desired. This is also described in greater detail below.

Figure 2:
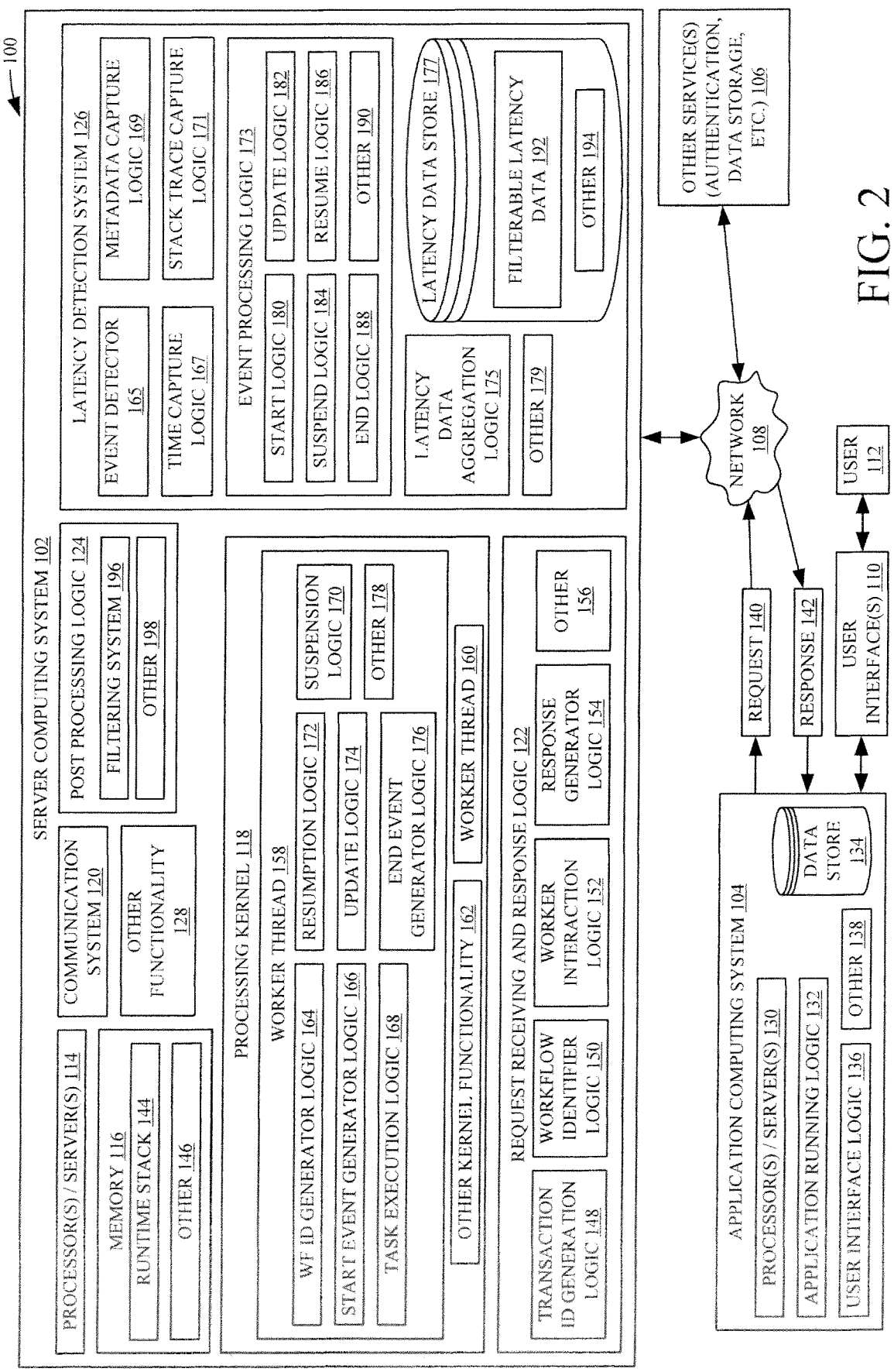
FIG. 2 is a more detailed block diagram of the computing system architecture shown in FIG. 1.

FIG. 2 is a block diagram showing one example of the architecture illustrated in FIG. 1, with portions shown in more detail. FIG. 2 shows that application computing system 104 includes one or more processors or servers 130, application running component 132, data store 134, user interface logic 136, and it can include a wide variety of other items 138. Application running logic 132 can run an application that sends a request 140 to server computing system 102. Server computing system 102 then performs any needed operations based on request 140 and returns a response 142 to application running logic 132. Therefore, in one example, application running logic 132 may be a client component of server computing system 102, that enables application computing system 104 to interact with server computing system 102. In another example, application running logic 132 is a separate piece of logic that runs a different application that interacts with the service hosted by server computing system 102 in submitting request 140 and receiving result 142.

User interface logic 136 illustratively generates user interfaces 110, and detects user interactions with interfaces 110. User interface logic 136 can send an indication of those interactions to other items on application computing system 104 or server computing system 102, or elsewhere.

FIG. 2 also shows that, in one example, memory 116 can include a runtime stack 144 and a wide variety of other items 146. The runtime stack 144 (which may also be referred to as a call stack, an execution stack, a control stack or other terms), illustratively stores information indicative of the sub-routines or other portions of server computing system 102 that are currently active. These active sub-routines or portions are ones that have been called but have not yet finished execution. The runtime stack tracks the point to which each of those active sub-routines will return control, when they have finished executing. Thus, at any given point in time, the information in runtime stack 144 represents a snapshot of the portions (sub-routines) of the computing system that are active, at that time.

FIG. 2 also shows that, in one example, request receiving and response logic 122 illustratively includes transaction identifier (ID) generation logic 148, workflow identifier logic 150, worker interaction logic 152, response generator logic 154, and it can include a wide variety of other items 156. Transaction ID generation logic 148 illustratively receives a request 140, to which system 102 is to respond and assigns the request a unique transaction ID. Workflow identifier logic 150 identifies the various workflows that will be executed in order to respond to request 140. Each workflow is illustratively a set of steps that are to be executed, in a given order, to respond to request 140. A transaction may include one or more different workflows. Worker interaction logic 152 illustratively interacts with processing kernel 118, as is described in more detail below, in order to have the workflows, identified by logic 150, executed and in order to obtain a result of those workflows. Response generator logic 154 generates response 142, based upon the results of the workflows that are executed by processing kernel 118, and uses communication system 120 to return result 142 to the application computing system 104 that made the request 140.

FIG. 2 also shows that, in one example, processing kernel 118 can include a plurality of different worker threads 158-160. It can also include a wide variety of other kernel functionality 162. Each worker thread 158-160 can be part of a thread pool of server threads or worker threads that are scheduled and used to process incoming requests (e.g., to execute the workflows that are used to respond to the request). Each worker thread is illustratively a unit of scheduling and execution which is used to execute the steps in a workflow. Threads can be scheduled and executed in a wide variety of different ways, which can depend on the particular operating system being used, the particular thread scheduling mechanisms and techniques being used, etc.

Suffice it to say, for purposes of the present description, that each worker thread has a mechanism for raising a set of latency events, one of which is raised when the worker thread starts executing a workflow, and another of which is raised when the worker thread completes execution of the workflow. The present description proceeds with respect to an example in which additional latency events are raised as well (such as events for updating the workflow identifier, suspending workflow execution and resuming workflow execution), but these are described for the sake of example only, and fewer latency events (such as just the start and end events) can be raised as well.

Thus, in the example described herein, each worker thread includes workflow ID generator logic 164, start event generator logic 166, task execution logic 168, suspension logic 170, resumption logic 172, update logic 174, end event generator logic 176, and it can include a wide variety of other items 178. Workflow ID generator logic 164 illustratively assigns a unique identifier to the workflow that is being executed by worker thread 158. Start event generator logic 166 raises an event when worker thread 158 begins executing the workflow.

Task execution logic 168 uses computing resources (e.g., sub-routines) to begin executing the various tasks in the workflow. Suspension logic 170 raises a suspend event when the task execution logic 168 suspends execution of the workflow. This can happen, for instance, when the workflow being executed makes a call, such as to other services 106, and is waiting for the result of that call. The workflow can also be suspended when the workflow has been handed off to another worker thread (e.g., thread 160). It can happen for other reasons as well.

Resumption logic 172 generates a resume event when logic 168 resumes execution of the tasks in the workflow when the reason it was suspended is addressed. For instance, if logic 168 suspends execution of the workflow because a call to an authentication service 106 has been made, then once the result of that call is returned, logic 168 resumes execution of the workflow, and resumption logic 172 raises a resume event indicative of that.

Update logic 174 raises an update event when task execution logic 168 controls workflow ID generator logic 164 to change the unique identifier corresponding to this workflow. This can be done, for instance, in order to connect two workflows together to perform a transaction.

End event generator logic 176 raises an end event when the workflow execution has been completed.

As briefly described above, latency detection system 126 illustratively detects these latency events and detects the latency corresponding to the workflow, based on these events, in a number of different ways. In the example shown in FIG. 2, latency detection system 126 illustratively includes event detector 165, time capture logic 167, metadata capture logic 169, stack trace capture logic 171, event processing logic 173, latency data aggregation logic 175, latency data store 177, and it can include a wide variety of other items 179.

Event detector 165 detects when an event is raised by one of the worker threads 158-160 in processing kernel 118. Time capture logic 167 captures a timestamp corresponding to some of those events and metadata capture logic 169 captures various metadata corresponding to those events. Stack trace capture logic 171 captures a stack trace which is a copy of the active subroutines or other components that are identified in runtime stack 144, when the event was raised. Event processing logic 173 performs various processing steps based upon the particular latency events that were raised. Latency data aggregation logic 175 aggregates latency data generated by event processing logic 173 across various aggregation criteria. Latency data store 177 illustratively stores the latency data, as filterable latency data 192 and it can include other items 194 as well. The data can be filtered in a wide variety of different ways, as described in more detail below with respect to FIG. 3.

Event processing logic 173 illustratively includes logic to process the latency events raised. In one example, where only the start and end events are raised, event processing logic 173 only has logic to process those events. However, continuing with the present example, in which additional latency events are raised, logic 173 includes start logic 180, update logic 182, suspend logic 184, resume logic 186, end logic 188, and it can include other items 190. Event processing logic 173 illustratively processes the various latency events that are raised by the items and logic in each of the worker threads 158-160. Thus, start logic 180 processes the start events, while update logic 182, suspend logic 184, and resume logic 186 process the update events, suspend events and resume events, respectively. End logic 188 processes the end events. The various processes that are performed when events are raised are described in greater detail below.

FIG. 2 also shows that, in one example, post processing logic 124 illustratively includes filtering system 196, and it can include other items 198. Filtering system 196 illustratively applies various filters to the filterable latency data 192 in order to generate and output information indicative of where latency arises in the various workflows that are executed by processing kernel 118. It can perform a wide variety of different types of post processing, on that information, as well. Some of those types of post processing are described in greater detail below as well.

Figure 3:
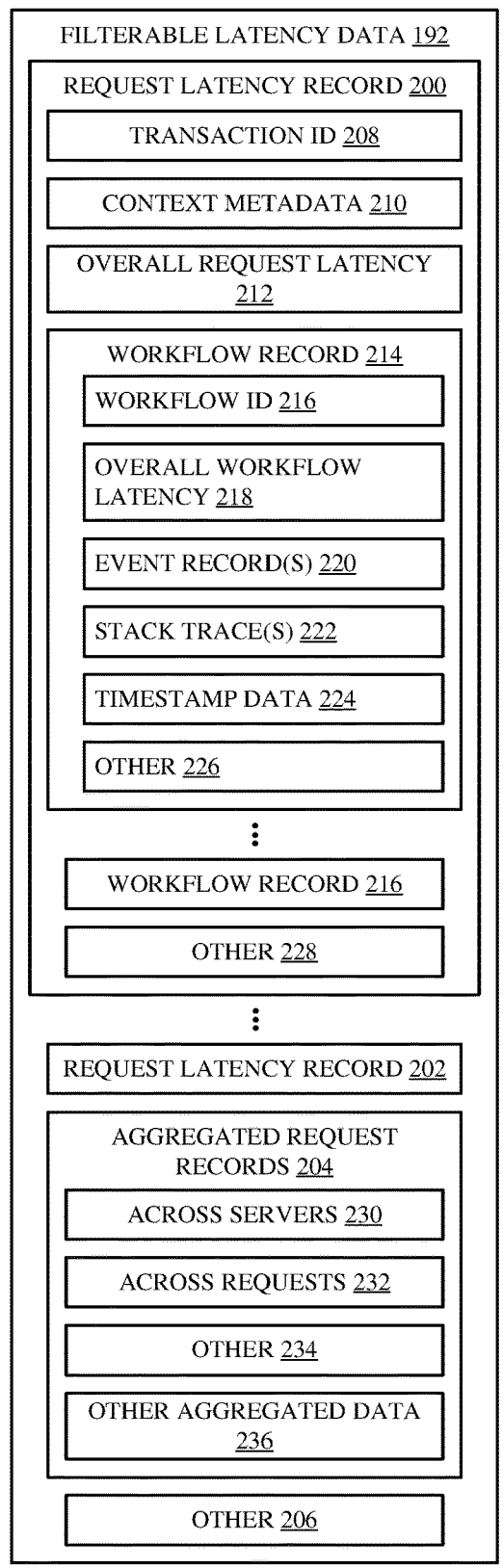
FIG. 3 is a block diagram showing filterable latency data that can be generated using the architecture shown in FIGS. 1 and 2.

FIG. 3 is a block diagram showing one example of filterable latency data 192, in more detail. Data 192 can illustratively include a plurality of request latency records 200-202, aggregated request records 204, and it can include a wide variety of other items 206. Each of the request latency records illustratively represents information corresponding to a given request 140 that is received by request receiving and response logic 122. The request can include a transaction identifier 208, assigned by transaction ID generation logic 148. It can include a wide variety of different types of context metadata 210, such as a server identifier identifying a server that sent and/or responded to the request, a build identifier identifying a particular build of the system that sent the request, a requesting application programming interface (API) identifier that identifies the requesting API, a client identifier that identifies the particular application computing system 104 (or other client computing system) that made the request, among a wide variety of other information. Request latency record 200 can also include an overall request latency 212 which identifies the latency corresponding to the request from the time request 140 was received until the time response 142 is generated.

Each request latency record 200 can also illustratively include a plurality of different workflow records 214-216 which include latency information corresponding to each particular workflow that was executed in order to respond to the request. Each workflow record 214 can include a workflow identifier 216 assigned by workflow ID generator logic 164, overall workflow latency 218, which identifies the overall latency of the workflow. It can include event records 220 identifying the various latency events that were raised and the corresponding information captured when those events were raised, as well as stack traces 222 that identify the stack traces that were captured when the events were raised. Each workflow record 214 can include timestamp data 224 indicative of the timestamps that were captured when the event was raised, and a wide variety of other things 226.

It will be noted that each request latency record 200-202 can include other things 228 as well. Those discussed above are discussed for the sake of example only.

The aggregated request records 204 illustratively include records that are aggregated by latency data aggregation logic 175. The data in request latency records 200-202 can be aggregated across a wide variety of different filter criteria. For instance, it can be aggregated across the requesting servers or the servers that were used in executing the workflows to respond to the request. This is indicated by block 230. It can be aggregated across the particular requests that were made, or by request type, where the latency data is grouped based on the type of request it responds to. For instance, there may be multiple occurrences of the same request by different requesting applications, or even by the same requesting application. The latency data corresponding to each of those requests may be aggregated based upon the type of request made. This is indicated by block 232. The aggregated data can be aggregated across a wide variety of other aggregation criteria. This is indicated by block 234. Similarly, other aggregated data, in addition to the latency data, can be stored in aggregated request records 204 as well. This is indicated by block 236.

Figure 4A:
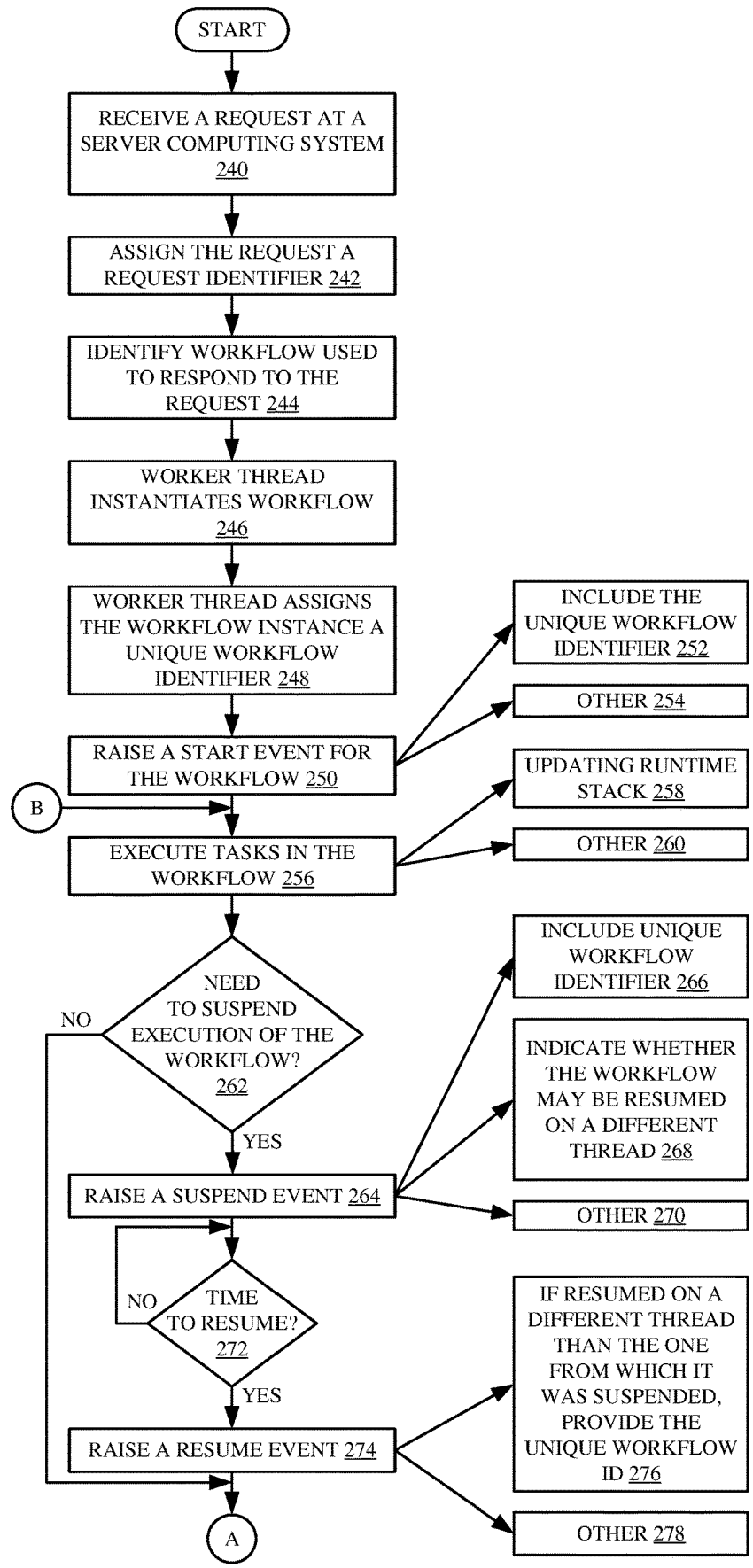
FIGS. 4A and 4B (collectively referred to herein as FIG. 4) show a flow diagram illustrating one example of the operation of a worker thread in executing a workflow in response to receiving a request at the server computing system.
Figure 4B:
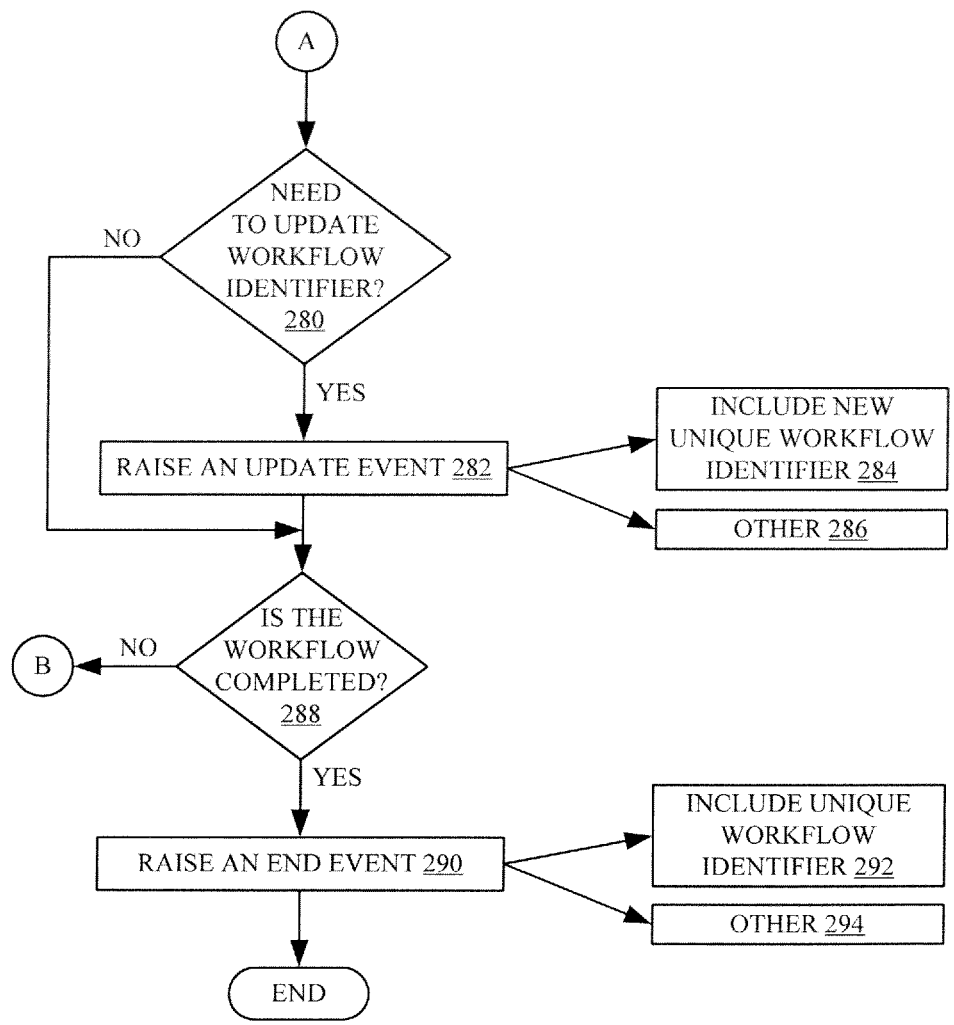

FIGS. 4A and 4B (collectively referred to herein as FIG. 4) illustrate a flow diagram showing one example of the operation of a worker thread 158 in executing a workflow, and raising the various latency events that are used by latency detection system 126. It will be appreciated that the same description could be made for a plurality of different workflows or different instances of the same workflow. Also, a given workflow may be operated on by different worker threads so that its operation can be handed off from one worker thread to another. All of these scenarios are contemplated herein, and the one described is described for the sake of example only. Further, this description is for the example in which additional latency events, in addition to the start and end events, are raised. This is just one example, as discussed above.

Request receiving and response logic 122 first receives a request 140 at server computing system 102. This is indicated by block 240 in the flow diagram of FIG. 4. Transaction ID generation logic 148 then assigns the request a unique transaction identifier. This is indicated by block 242. All of the different workflows that are performed in responding to request 140 will be associated with that transaction identifier.

Workflow identifier logic 150 then identifies the various workflows that are to be used in generating response 142 to request 140. This is indicated by block 244. These workflows are identified to processing kernel 118 where a worker thread 158-160 then instantiates and begins to perform each of the workflows. This is indicated by block 246 in the flow diagram of FIG. 4.

Workflow ID generator logic 164 assigns the workflow instance that it is executing a unique workflow identifier. This is indicated by block 248.

When the worker thread (in the present example it will be assumed that worker thread 158 is executing the tasks in a workflow) begins executing the workflow, start event generator logic 166 raises a start event for that workflow. This is indicated by block 250 in the flow diagram of FIG. 4. The start event that is raised by start event generator logic 166 and it can include the unique workflow identifier for which the event was raised and the transaction ID as well. This is indicated by block 252. It can include a wide variety of other information 254 as well.

Task execution logic 168 executes the various tasks in the workflow. This is indicated by block 256. As this is occurring, the processor, operating system or thread, itself, updates the runtime stack 144 to indicate the various subroutines or parts of computing system 102 that are active in executing those tasks. Updating the runtime stack 144 is indicated by block 258. Execution of the workflow tasks can include a wide variety of other items as well, and this is indicated by block 260.

At some point during execution of the workflow, it is assumed for the sake of the present description that task execution logic 168 needs to suspend execution of the workflow for any of a variety of reasons. When this occurs, as indicated by block 262 in the flow diagram of FIG. 4, then suspension logic 170 raises a suspend event. This is indicated by block 264. In one example, the suspend event can include the unique identifier that identifies the workflow that raised the event and the transaction ID. This is indicated by block 266. The suspend event can indicate whether the workflow may be resumed on a different worker thread 160. This is indicated by block 268. It need not indicate any particular thread it is to be resumed on, but may only provide an indicator that indicates that it may be resumed on a different thread than the thread that raised the event. The suspend event can include a wide variety of other items as well, and this is indicated by block 270. It is assumed, for the sake of the present description, that the worker thread that raised the event will also resume processing of the event.

When logic 168 resumes processing of the workflow, this is illustratively detected by resumption logic 172. When that occurs, as indicated by block 272, resumption logic 172 raises a resume event. This is indicated by block 274. If the resume event were to be raised by a worker thread that is different from the one that raised the suspend event, then the resume event will also include the unique workflow identifier corresponding to the workflow that raised the event. This is indicated by block 276. The reason this is done is described in greater detail below with respect to FIG. 8. The resume event can include other items 278 as well.

It may also be that, during or after the execution of the workflow, task execution logic 168 determines that it is to update the workflow identifier corresponding to this workflow. If that occurs, as indicated by block 280 in FIG. 4, then update logic 174 raises an update event 282. The update event will include the new unique workflow identifier that is being assigned to the workflow. This is indicated by block 284. The update event can include other items as well, as indicated by block 286.

If the workflow is not yet completed, then processing reverts to block 256 where task execution logic 168 continues to execute the tasks corresponding to the workflow and the runtime stack 144 continues to be updated. However, if, at block 288, it is determined that the workflow has been completed, then end event generator logic 176 raises an end event. This is indicated by block 290. The end event illustratively includes the unique workflow identifier identifying the workflow that has just completed execution. This is indicated by block 292. The end event can include a wide variety of other items as well, as indicated by block 294.

Figure 5:
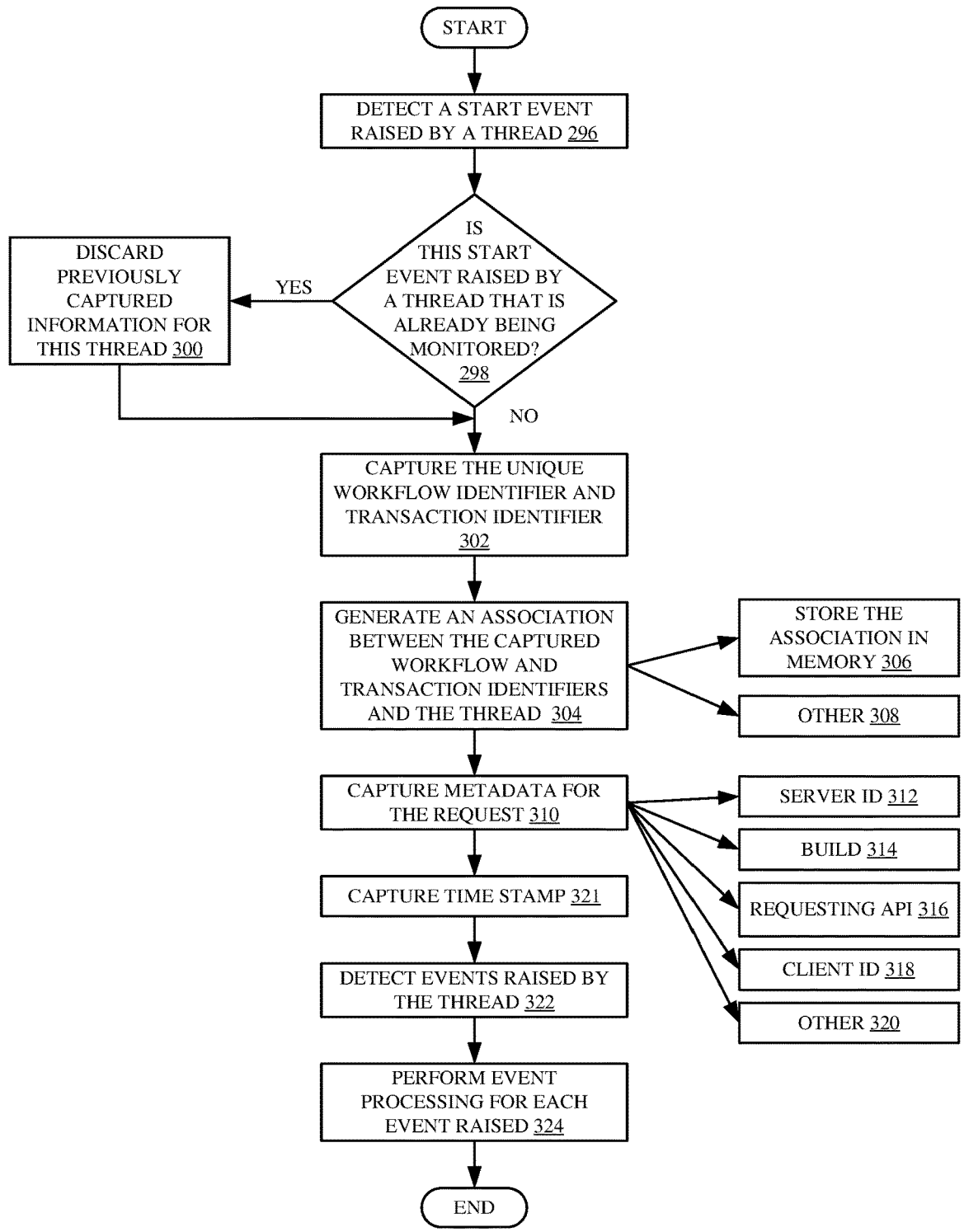
FIG. 5 is a flow diagram illustrating one example of the operation of event processing logic in processing a start event.

FIG. 5 is a flow diagram illustrating one example of the operation of start logic 180 in event processing logic 173 of latency detection system 126. FIG. 5 shows one example of the processing that is performed by start logic 180 when a start event is raised by start event generator logic 166. It is thus first assumed that event detector 165 has detected a start event that has been raised by one of the worker threads 158-160. Detecting the start event is indicated by block 296 in the flow diagram of FIG. 5. Start logic 180 then determines whether the start event was raised by a thread that is already being monitored (e.g., one for which a start event has already been received but no end or update event has been received). This is indicated by block 298. If so, then any previously captured information for this thread is discarded. This is indicated by block 300.

If, at block 298, it has been determined that the start event is raised by a thread that is not already being monitored, or once any previously captured information is discarded as indicated by block 300, then start logic 180 captures the unique identifier that was indicated in the start event and the transaction identifier corresponding to this workflow (which may also be indicated in the start event). Capturing this information is indicated by block 302.

Start logic 180 then generates an association between the captured workflow and transaction identifiers and the thread that raised the start event. This is indicated by block 304. This association can be captured as a mapping or another association, and logic 180 can generate a control signal to control latency data store 177 (or another data store) to store the association. Storing the association between the workflow identifier (and transaction identifier) and the thread that raised the start event is indicated by block 306. The association can be stored in other ways as well, and this is indicated by block 308.

Start logic 180 then also controls metadata capture logic 169 to capture any metadata corresponding to the workflow that is being executed and that resulted in the start event being raised. This is indicated by block 310. By way of example, metadata capture logic 169 can capture the identity of the server that generated or received the request. This is indicated by block 312. It can capture the build identifier that identifies the particular build of the code that generated or is executing the request. This is indicated by block 314. It can capture information indicative of the requesting API as indicated by block 316. It can capture a client identifier that identifies the client that made the request, as indicated by block 318. It can also capture a wide variety of other metadata. This is indicated by block 320. It also controls time capture logic 167 to capture a time stamp corresponding to the start event. This is indicated by block 321.

Once start logic 180 has controlled the various other items of logic to perform the processing corresponding to a detected start event, then event detector 165 continues to detect any other events raised by the thread that is executing this workflow. This is indicated by block 322. The event processing logic 173 performs any event processing for each of the events raised. Some of this is described below with respect to FIGS. 6-9. Performing event processing is indicated by block 324 in the flow diagram of FIG. 5.

Figure 6:
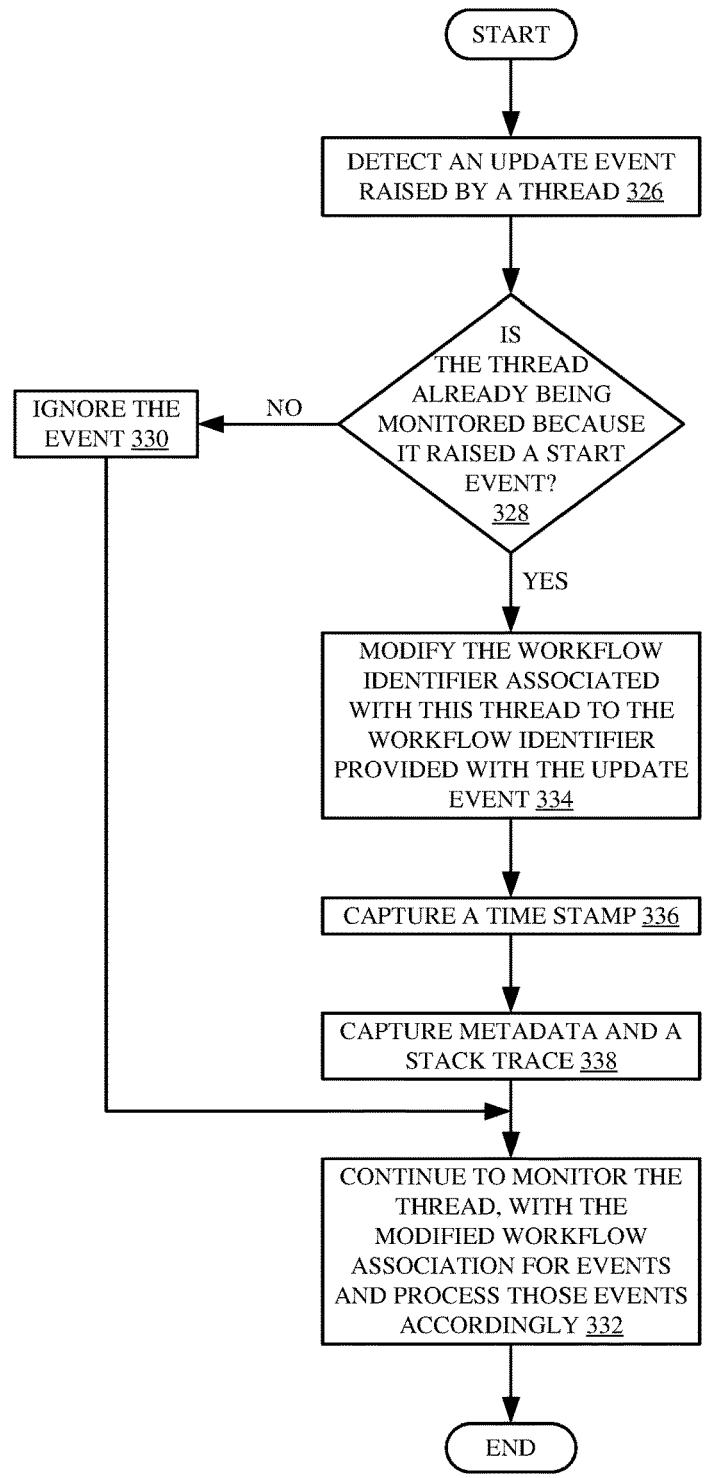
FIG. 6 is a flow diagram illustrating one example of the operation of the event processing logic in processing an update event.

FIG. 6 is a flow diagram illustrating one example of the operation of update logic 182 in performing processing once an update event has been raised by worker thread 158. Therefore, it is first assumed that event detector 165 has detected an update event, that was raised by update logic 174 in worker thread 158. This is indicated by block 326 in the flow diagram of FIG. 6.

Update logic 182 then determines whether the thread that raised the update event is already being monitored because it has previously raised a start event. This is indicated by block 328. If the thread that raised the update event is not being monitored (because it has not previously raised a start event), then update logic 182 ignores the update event. This is indicated by block 330. Event detector 164 then continues to monitor this thread, for events and it processes those events as is described with respect to FIGS. 5 and 7-9. This is indicated by block 332.

However, if, at block 328, it is determined that the thread that raised the update events is a thread that is already being monitored, then update logic 182 modifies the unique workflow identifier associated with this thread (recall that the association between the thread and the workflow identifier was generated when the start event was raised), to the workflow identifier provided along with the update event by update logic 174. Modifying the workflow identifier associated with this thread is indicated by block 334 in the flow diagram of FIG. 6. Update logic 182 also controls time capture logic 167 to capture a timestamp corresponding to when the update event was raised. Capturing the timestamp is indicated by block 336.

Update logic 182 also controls metadata capture logic 169 and stack trace capture logic 171 to capture any desired metadata, along with a stack trace from runtime stack 144. Capturing the metadata and stack trace is indicated by block 338 in the flow diagram of FIG. 6. Latency detection system 126 continues to monitor the thread for events, and event processing logic 173 continues to process those events.

The update event can be used, as mentioned above, to connect two independent workflows that are part of the same transaction (e.g., part of responding to the same request 140). This results in two different workflows that complete with the same unique identifier indicating that they are both part of the same transaction.

Figure 7:
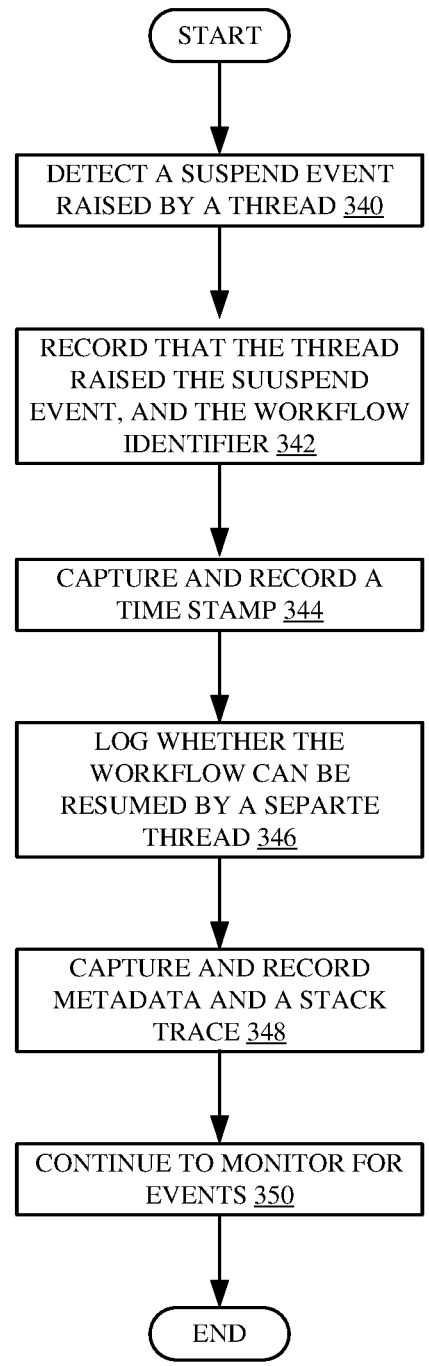
FIG. 7 is a flow diagram illustrating one example of the operation of the event processing logic in processing a suspend event.

FIG. 7 is a flow diagram illustrating one example of the operation of suspend logic 184 in performing processing when a suspend event is raised by suspension logic 170 in worker thread 158. It is therefore assumed that event detector 165 has detected a suspend event raised by worker thread 158. This is indicated by block 340 in the flow diagram of FIG. 7.

Suspend logic 184 then records and indication in latency data store 177 (or elsewhere) that worker thread 158 raised the suspend event, and it also records the unique workflow identifier for which the event was raised. This is indicated by block 342.

Suspend logic 184 then controls time capture logic 167 to capture and record a timestamp corresponding to when the event was raised. This is indicated by block 344. Suspend logic 184 also records whether the workflow, for which the suspend event was raised, can be resumed by a separate thread. Recall that, in raising the suspend event, suspension logic 170 also provides an output indicative of whether the workflow can be resumed on a separate thread. Controlling latency data store 177 to log an indication of this is indicated by block 346 in the flow diagram of FIG. 7.

Suspend logic 184 also controls stack trace capture logic 171 and metadata capture logic 169 to capture and record any metadata, along with a stack trace from runtime stack 144. This is indicated by block 348 in the flow diagram of FIG. 7. Latency detection system 126 then continues to monitor for events, and event processing logic 173 performs processing associated with each of those events. Thus is indicated by block 350 in the flow diagram of FIG. 7.

Figure 8:
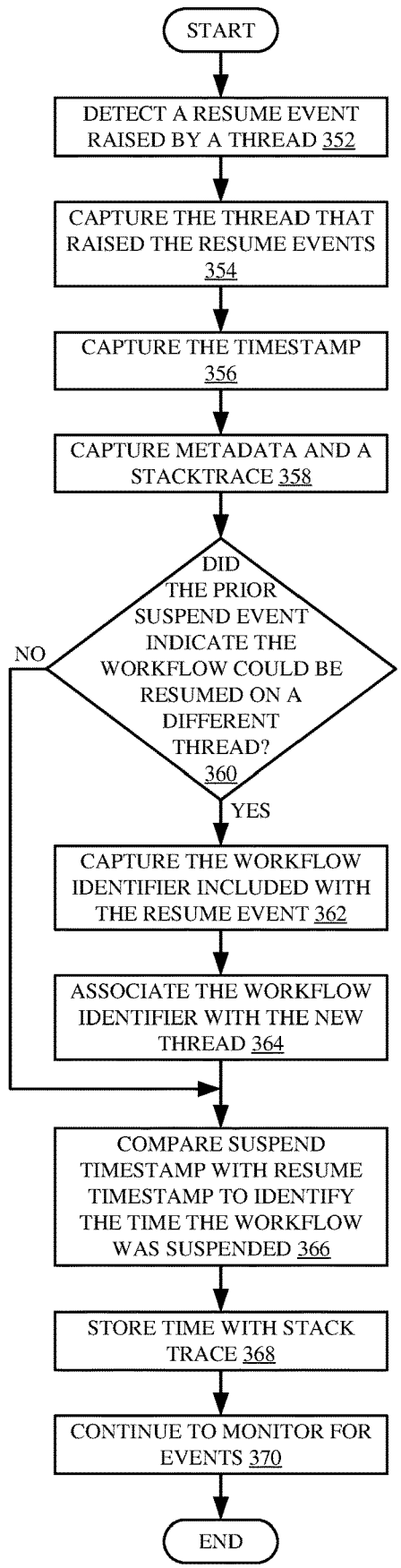
FIG. 8 is a flow diagram illustrating one example of the operation of the event processing logic in processing a resume event.

FIG. 8 is a flow diagram illustrating one example of the operation of resume logic 169 in performing processing when a resume event is raised by resumption logic 172. Therefore, it is first assumed that event detector 165 detects a resume event raised by worker thread 158. This is indicated by block 352 in the flow diagram of FIG. 8.

Resume logic 186 captures the identity of worker thread 158, that raised the resume event. It can store it in latency data store 177, as part of one of the request latency records, or elsewhere. Capturing an identity of the thread that raised the resume event is indicated by block 354.

Resume logic 186 also controls timestamp capture logic 167 to capture a timestamp corresponding to when the event was raised. This is indicated by block 356. It controls metadata capture logic 169 and stack trace capture logic 171 to also capture any desired metadata, along with a stack trace from runtime stack 144. Capturing any desired metadata, and the stack trace, is indicated by block 358 in the flow diagram of FIG. 8.

Resume logic 186 also determines whether the prior suspend event indicated that the workflow could be resumed on a different thread. Recall that this information was logged in association with the suspend event. Making this determination is indicated by block 260 in the flow diagram of FIG. 8. If so, then resume logic 186 captures the workflow identifier included with the resume event (that was raised by resumption logic 172). This is indicated by block 362. Resume logic 186 then associates the workflow identifier with the new thread, in latency data store 177 (or wherever else that association was logged). Modifying the association so that the workflow identifier is associated with a new thread is indicated by block 364.

Regardless of whether the workflow is now on a new thread (as indicated by block 360), resume logic 186 then compares the resume timestamp that was just captured, with the suspend timestamp that was captured with respect to this workflow to identify the time that this workflow was suspended. This is indicated by block 366. Resume logic 186 then controls latency data store 177 (or another data store) to store the time that this workflow was suspended, along with the stack trace and other metadata information that was captured. This is indicated by block 368.

Latency detection system 126 then continues to monitor for events raised by worker thread 158 (or other worker threads). Event processing logic 173 continues to process those events. This is indicated by block 370.

Figure 9:
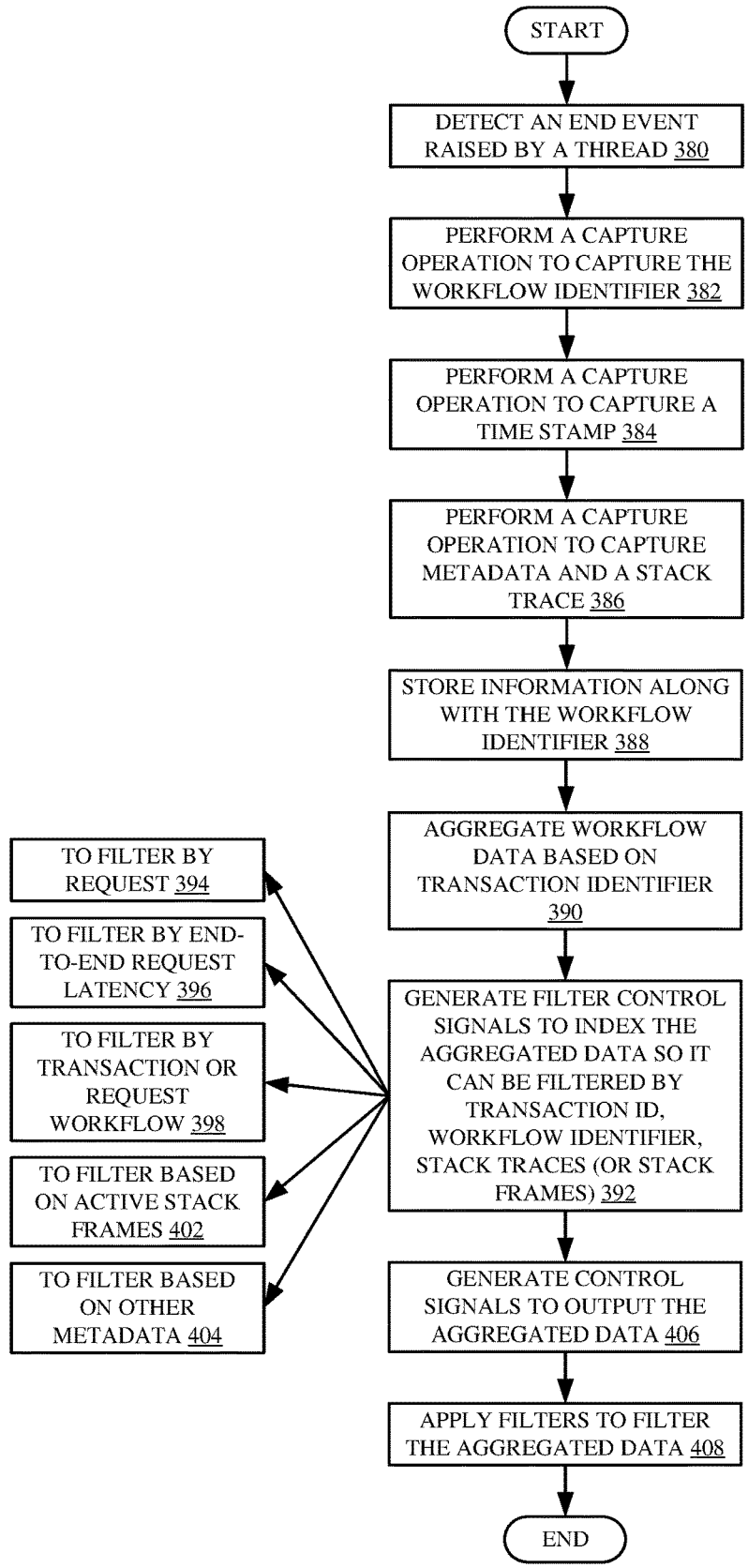
FIG. 9 is a flow diagram illustrating one example of the operation of the event processing logic in processing an end event.

FIG. 9 is a flow diagram illustrating one example of the operation of end logic 188 in performing processing steps based on detection of an end event. Thus, it is first assumed that event detector 165 has detected an end event raised by end event generator logic 176 in worker thread 158. Detecting the end event raised by the thread is indicated by block 380 in the flow diagram of FIG. 9.

End logic 186 performs a capture operation to capture the workflow identifier for which the end event was raised. This is indicated by block 382. It also controls time capture logic 167 to perform a capture operation to capture a timestamp corresponding to when the end event was raised. This is indicated by block 384.

End logic 188 also controls metadata capture logic 169 and stack trace capture logic 171 to capture metadata and to capture a stack trace from runtime stack 144. This is indicated by block 386.

End logic 188 then controls latency data store 177 to store this information, along with the workflow identifier that identifies the workflow associated with this information. This is indicated by block 388.

At some point, latency data aggregation logic 175 aggregates the workflow latency data based on the various transaction identifiers and workflow identifiers so that the latency information for each of the workflows in a given transaction can be aggregated together. This is indicated by block 390. Latency data aggregation logic 175 then generates filter control signals to index the data in latency data store 177 so that it can be filtered by transaction ID, workflow ID, stack traces (or stack frames) or a wide variety of other filter criteria, in order to obtain filterable latency data 192. Generating the filter control signals to aggregate and index the data in this way is indicated by block 392.

In one example, logic 175 aggregates the data so that it can be filtered based upon the type of request for which the data was generated. This is indicated by block 394. In another example, it can be aggregated to filter It based on end-to-end request latency as indicated by block 396. In another example, it can aggregated so that it can be filtered by a particular type of transaction or workflow or by an individual transaction or workflow. This is indicated by block 398. In another example, it can be aggregated so that it can be filtered based upon the information in the active stack frames that were captured in the various stack traces. This is indicated by block 402. In another example, it is aggregated so that it can be based on any of a wide variety of other metadata that was captured (the build, server, client, requesting API, etc.). This is indicated by block 404.

Once the filterable latency data 192 has been generated, then post processing logic 124 can access it and perform post processing in any of a wide variety of different ways. In one example, filter system 196 generates control signals to filter and output the data to other remote systems for further processing, or in other ways. This is indicated by block 406. Filtering system 196 can apply filters to filterable latency data 192 in any of a wide variety of ways, using a wide variety of filters. It can input the filtered data for any types of processing. This is indicated by block 408.

Grouping by various metadata or other properties provides information indicative of the different behaviors that can result even under a set of identical conditions. Grouping by information in the stack traces provides information indicative of different properties and conditions that trigger specific paths. A view of the stacks resulting in the most suspended time can be identified, and control signals can be generated to control the system in order to improve its operation. Aggregation can be performed on individual stack frames that make up the stack so that they can be counted in order to help determine which paths are encountered the most. The information can also be aggregated to identify the amount of time, across all transactions, that is lost to a suspended workflow. The system thus ties the events raised and thread transitions to individual requests 140. Dividing the requests into groups based on end-to-end latency corresponding to the request, and joining the transaction data with metadata can fill in extra information about the request. It will be noted that this technique is easily scalable so that it can be applied to data generated by many thousands of different machines. This significantly enhances operation of the computing system itself. By having the worker threads, themselves, raise these events, and then by having an external observer observe and process the events, timestamp capture information need not be written into the code that's processing the requests. Instead, simply raising these events provides information that increases the accuracy of the system in surfacing information indicative of latency. It also greatly increases the granularity with which the information can be raised (e.g., on a workflow-by-workflow basis, on an event-by-event basis, etc.). Thus, the system is much more accurate in identifying and aggregating latency data.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
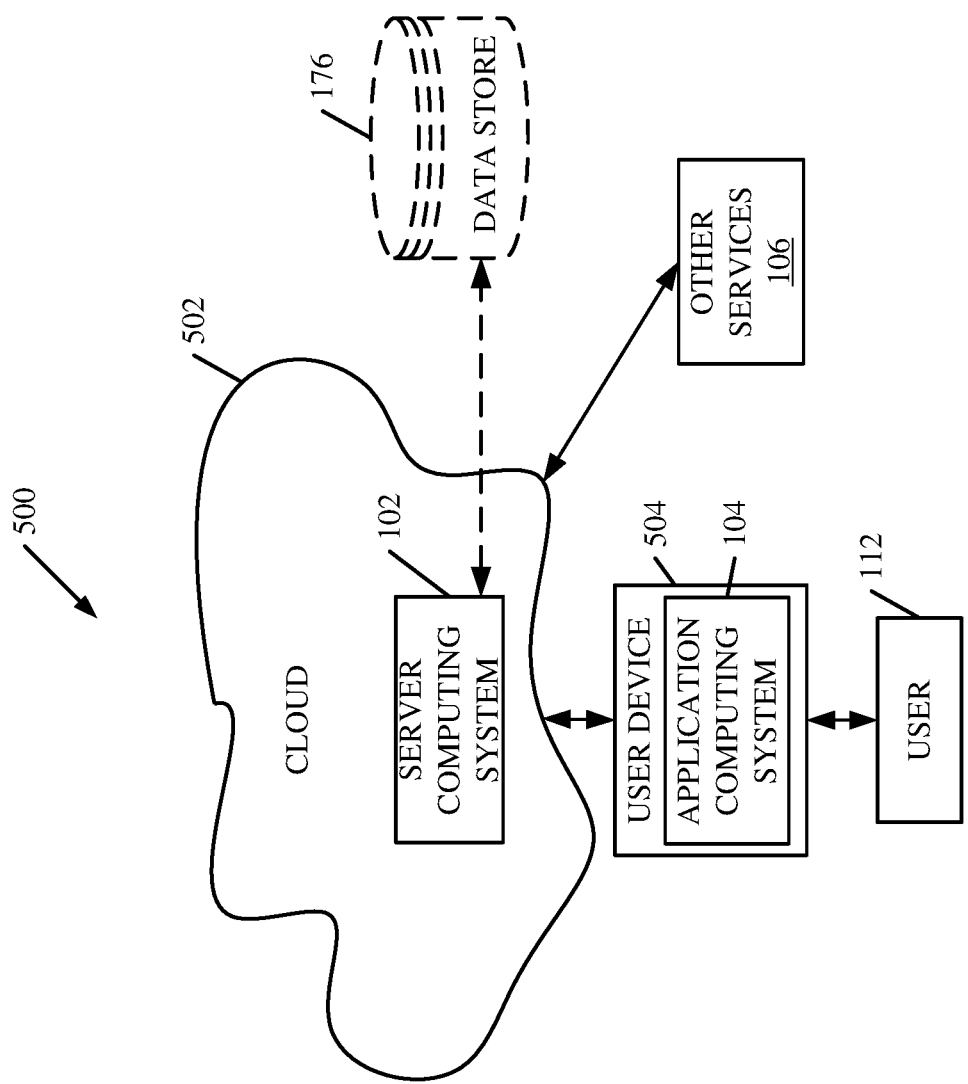
FIG. 10 is a block diagram showing one example of the architecture illustrated in FIGS. 1 and 2, deployed in a cloud computing architecture.

FIG. 10 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 10, some items are similar to those shown in FIG. 1 and they are similarly numbered. FIG. 10 specifically shows that server computing system 102 can be located in cloud 502 (which can be public, private, or a combination where portions are public while others are private). Therefore, user 112 uses a user device 504 to access those systems through cloud 502.

FIG. 10 also depicts another example of a cloud architecture. FIG. 10 shows that it is also contemplated that some elements of computing system 102 can be disposed in cloud 502 while others are not. By way of example, data store 172 can be disposed outside of cloud 502, and accessed through cloud 502. Regardless of where the items are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
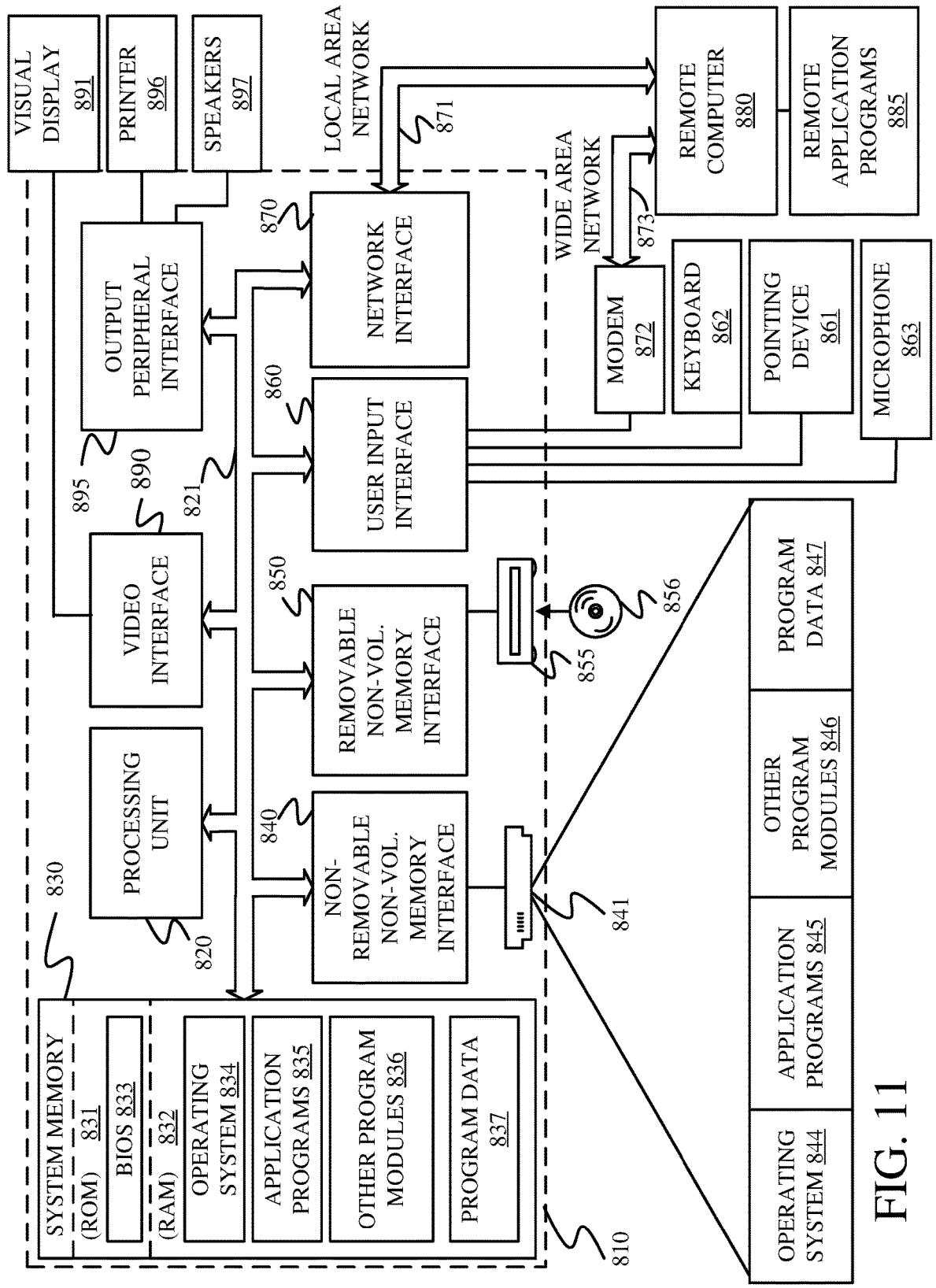
FIG. 11 is a block diagram showing one example of a computing environment that can be used in the architectures shown in the previous figures.

FIG. 11 is one example of a computing environment in which architecture 100, or parts of it, (for example) can be deployed. With reference to FIG. 11, an example system for implementing some examples includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

request receiving logic that receives a request, assigns the request a transaction identifier and identifies a plurality of workflows corresponding to the request, each workflow having a set of tasks to be executed to generate a response to the request;

task execution logic, in a first worker thread, that activates computing subroutines in the computing system to execute the tasks in a first workflow of the identified workflows;

a memory that stores a runtime stack indicative of the computing subroutines of the computing system that are active;

event raising logic that raises a latency event when a latency operation is performed by the task execution logic in executing the tasks in the first workflow;

time capture logic that captures a time stamp;

stack trace capture logic that captures a stack trace of the runtime stack;

event processing logic, external to the first worker thread, that detects the latency event and generates control signals to control the time capture logic to capture a timestamp and to control the stack trace capture logic to capture a stack trace of the runtime stack, in response to the latency event; and data aggregation logic that aggregates captured timestamps and captured stack traces across the plurality of different workflows corresponding to the request, based on the transaction identifier.

Example 2 is the computing system of any or all previous examples wherein the data aggregation logic is configured to identify an end-to-end latency indicative of a time to respond to the request, based on the aggregated timestamps.

Example 3 is the computing system of any or all previous examples wherein the event processing logic comprises:

metadata capture logic configured to capture metadata based on the detected latency event, the data aggregation logic aggregating the metadata across the plurality of different workflows.

Example 4 is the computing system of any or all previous examples wherein the request receiving logic is configured to receive a plurality of different requests, of different request types, and wherein the data aggregation logic is configured to aggregate the captured timestamps and the captured stack traces across the plurality of different requests based on the request types.

Example 5 is the computing system of any or all previous examples wherein the worker thread comprises workflow identifier generator logic configured to assign a workflow identifier to the first workflow, and wherein the event raising logic comprises:

start event generator logic that raises a start event when the task execution logic begins executing the tasks for the first workflow, the start event including the workflow identifier assigned to the first workflow.

Example 6 is the computing system of any or all previous examples wherein the event processing logic comprises:

start logic configured to store a workflow-thread association between the first workflow and the worker thread that raised the start event based on the workflow identifier assigned to the first workflow.

Example 7 is the computing system of any or all previous examples wherein the first worker thread includes update logic configured to raise an update event indicative of a change in the workflow identifier assigned to the first workflow to an updated workflow identifier and wherein the event processing logic comprises:

update logic configured to determine whether the first worker thread is associated with the start event, and if so, modify the workflow-thread association based on the updated workflow identifier.

Example 8 is the computing system of any or all previous examples wherein the first worker thread includes suspension logic configured to raise a suspend event indicative of the task execution logic suspending execution of the tasks in the first workflow and wherein the event processing logic comprises:

suspend logic configured to control the time capture logic to capture a timestamp indicative of when the task execution logic suspended execution of the tasks in the first workflow and generate a suspension event record including a thread identifier indicative of the first worker thread and the timestamp.

Example 9 is the computing system of any or all previous examples wherein the suspension logic is configured to raise the suspend event to include an indication of whether the first workflow can be resumed on a different worker thread, different from the first worker thread.

Example 10 is the computing system of any or all previous examples wherein the first worker thread includes resumption logic configured to raise a resume event indicative of the task execution logic resuming execution of the tasks in the first workflow and wherein the event processing logic comprises:

resume logic configured to control the time capture logic to capture a timestamp indicative of when the task execution logic resumed execution of the tasks in the first workflow and to control the stack trace capture logic to capture a stack trace and to generate a resumption event record including the timestamp and the stack trace.

Example 11 is the computing system of any or all previous examples wherein, if the suspend event included the indication that the first workflow can be resumed on a different worker thread, different from the first worker thread, then the resume logic is configured to capture the workflow identifier assigned to the first workflow, from the resume event, and to modify the workflow-thread association to indicate that the different thread, that raised the resume event, is associated with the first workflow.

Example 12 is the computing system of any or all previous examples wherein the resume logic is configured to generate a suspended time metric indicative of a time that the first workflow was suspended based on the timestamp that indicates when the task execution logic suspended execution of the tasks in the first workflow and the timestamp that indicates when the task execution logic resumed execution of the tasks in the first workflow, and to include the suspend time metric in the resumption event record.

Example 13 is the computing system of any or all previous examples wherein the first worker thread includes end event generator logic configured to raise an end event indicative of the task execution logic completing execution of the tasks in the first workflow and wherein the event processing logic comprises:

end logic configured to control the time capture logic to capture a timestamp indicative of when the task execution logic completed execution of the tasks in the first workflow and to control the stack trace capture logic to capture a stack trace and to generate an end event record including the timestamp and the stack trace.

Example 14 is a computer implemented method, comprising:

receiving a service request;
assigning the service request a transaction identifier;
identifying a plurality of workflows corresponding to the request, each workflow having a set of tasks to be executed to generate a response to the request;
activating, with a first worker thread, computing subroutines to execute the tasks in a first workflow of the identified workflows;
maintaining a runtime stack indicative of the computing subroutines that are active;
raising a latency event, with the first worker thread, when a latency operation is performed in executing the tasks in the first workflow;
detecting the latency event at an event detector that is separate from the first worker thread;
generating control signals to capture a timestamp and to capture a stack trace of the runtime stack, in response to the latency event; and
aggregating captured timestamps and captured stack traces across the plurality of different workflows corresponding to the request, based on the transaction identifier to identify an end-to-end latency indicative of a time to respond to the request, based on the aggregated timestamps.

Example 15 is the computer implemented method of any or all previous examples wherein receiving a service request comprises:

receiving a plurality of different requests, of different request types, and wherein aggregating includes aggregating the captured timestamps and the captured stack traces across the plurality of different requests based on the request types.

Example 16 is the computer implemented method of any or all previous examples and further comprising assigning a workflow identifier to the first workflow, and wherein raising a latency event comprises raising a start event when the computing subroutines begin executing the tasks for the first workflow, the start event including the workflow identifier assigned to the first workflow, and raising an end event when the computing subroutines complete execution of the tasks in the first workflow and wherein generating control signals comprises:

controlling time capture logic to capture a start timestamp based on the start event;

controlling a data store to store a workflow-thread association between the first workflow and the worker thread that raised the start event based on the workflow identifier assigned to the first workflow;

controlling the time capture logic to capture an end timestamp based on the end event; and controlling stack trace capture logic to capture an end stack trace, based on the end event.

Example 17 is the computer implemented method of any or all previous examples wherein raising a latency event comprises raising a suspend event indicative of the computing subroutines suspending execution of the tasks in the first workflow, and raising a resume event indicative of the computing subroutines resuming execution of the tasks in the first workflow and wherein generating control signals comprises:

controlling the time capture logic to capture a suspend timestamp based on the suspend event;

controlling the stack trace capture logic to capture a suspend stack trace;

controlling the time capture logic to capture a resume timestamp based on the resume event;

controlling the stack trace capture logic to capture a resume stack trace;

controlling the data store to generate a suspend-resume event record including a thread identifier indicative of the first worker thread, the suspend timestamp, the suspend stack trace, the resume timestamp and the resume stack trace;

generating a suspended time metric indicative of a time that the first workflow was suspended based on the suspend timestamp and the resume timestamp; and controlling the data store to include the suspend time metric in the suspend-resume event record.

Example 18 is the computer implemented method of any or all previous examples wherein raising the suspend event includes providing an indication of whether the first workflow can be resumed on a different worker thread, different from the first worker thread, and if the suspend event included the indication that the first workflow can be resumed on a different worker thread, different from the first worker thread, then generating control signals comprises:

identifying the workflow identifier assigned to the first workflow, from the resume event; and controlling the data store to modify the workflow-thread association to indicate that the different thread, that raised the resume event, is associated with the first workflow.

Example 19 is a computing system, comprising:

request receiving logic that receives a request, assigns the request a transaction identifier and identifies a plurality of workflows corresponding to the request, each workflow having a set of tasks to be executed to generate a response to the request;

task execution logic, in a first worker thread, that activates computing subroutines in the computing system to execute the tasks in a first workflow of the identified workflows;

a memory that stores a runtime stack indicative of the computing subroutines of the computing system that are active;

event raising logic that raises a latency event when a latency operation is performed by the task execution logic in executing the tasks in the first workflow;

time capture logic that captures a time stamp;

stack trace capture logic that captures a stack trace of the runtime stack;

event processing logic, external to the first worker thread, that detects the latency event and generates control signals to control the time capture logic to capture a timestamp and to control the stack trace capture logic to capture a stack trace of the runtime stack, in response to the latency event; and data aggregation logic that aggregates captured timestamps and captured stack traces across the plurality of different workflows corresponding to the request, based on the transaction identifier and to identify an end-to-end latency indicative of a time to respond to the request, based on the aggregated timestamps.

Example 20 is the computing system of any or all previous examples wherein the request receiving logic is configured to receive a plurality of different requests, of different request types, and wherein the data aggregation logic is configured to aggregate the captured timestamps and the stack captured traces across the plurality of different requests based on the request types.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

request receiving logic configured to:

receive a request, assign the request a transaction identifier, and identify a plurality of workflows corresponding to the request, each workflow having a set of tasks to be executed to generate a response to the request; and interact with a plurality of worker threads to execute the plurality of workflows, wherein each worker thread corresponds to one of the workflows and comprises:

task execution logic, in the worker thread, that activates computing subroutines in the computing system to execute the tasks in the corresponding workflow; and event raising logic, in the worker thread, that raises a latency event when a latency operation is performed by the task execution logic in executing the tasks in the corresponding workflow;

a memory that stores a runtime stack indicative of the computing subroutines of the computing system that are active; and a latency detection system that is external to the plurality of worker threads and comprises:
- an event detector configured to detect the latency events raised by the plurality of worker threads;
- time capture logic configured to capture time stamps corresponding to the detected latency events;
- stack trace capture logic;
- event processing logic configured to control the stack trace capture logic to capture, for each latency event, a stack trace of the runtime stack, in response to the latency event; and
- data aggregation logic configured to aggregate the captured timestamps and captured stack traces across the plurality of different workflows corresponding to the request, based on the transaction identifier.

2. The computing system of claim 1 wherein the data aggregation logic is configured to identify an end-to-end latency indicative of a time to respond to the request, based on the aggregated timestamps.

3. The computing system of claim 1 wherein the event processing logic comprises:
- metadata capture logic configured to capture metadata based on the detected latency event, the data aggregation logic aggregating the metadata across the plurality of different workflows.

4. The computing system of claim 1 wherein the request receiving logic is configured to receive a plurality of different requests, of different request types, and wherein the data aggregation logic is configured to aggregate the captured timestamps and the captured stack traces across the plurality of different requests based on the request types.

5. The computing system of claim 1 wherein the worker thread comprises workflow identifier generator logic configured to assign a workflow identifier to each workflow, and wherein the event raising logic comprises:
- start event generator logic configured to raise a start event when the task execution logic begins executing the tasks for a first workflow, the start event including the workflow identifier assigned to the first workflow.

6. The computing system of claim 5 wherein the event processing logic comprises:
- start logic configured to store a workflow-thread association between the first workflow and the worker thread that raised the start event based on the workflow identifier assigned to the first workflow.

7. The computing system of claim 5 wherein a first worker thread includes update logic configured to raise an update event indicative of a change in the workflow identifier assigned to the first workflow to an updated workflow identifier and wherein the event processing logic comprises:
- update logic configured to determine whether the first worker thread is associated with the start event, and if so, modify the workflow-thread association based on the updated workflow identifier.

8. The computing system of claim 1 wherein a first worker thread includes suspension logic configured to raise a suspend event indicative of the task execution logic suspending execution of the tasks in the first workflow and wherein the event processing logic comprises:
- suspend logic configured to control the time capture logic to capture a timestamp indicative of when the task execution logic suspended execution of the tasks in the first workflow and generate a suspension event record including a thread identifier indicative of the first worker thread and the timestamp.

9. The computing system of claim 8 wherein the suspension logic is configured to raise the suspend event to include an indication of whether the first workflow can be resumed on a different worker thread, different from the first worker thread.

10. The computing system of claim 9 wherein the first worker thread includes resumption logic configured to raise a resume event indicative of the task execution logic resuming execution of the tasks in the first workflow and wherein the event processing logic comprises:
- resume logic configured to control the time capture logic to capture a timestamp indicative of when the task execution logic resumed execution of the tasks in the first workflow and to control the stack trace capture logic to capture a stack trace and to generate a resumption event record including the timestamp and the stack trace.

11. The computing system of claim 10 wherein, if the suspend event included the indication that the first workflow can be resumed on a different worker thread, different from the first worker thread, then the resume logic is configured to capture the workflow identifier assigned to the first workflow, from the resume event, and to modify the workflow-thread association to indicate that the different thread, that raised the resume event, is associated with the first workflow.

12. The computing system of claim 11 wherein the resume logic is configured to generate a suspended time metric indicative of a time that the first workflow was suspended based on the timestamp that indicates when the task execution logic suspended execution of the tasks in the first workflow and the timestamp that indicates when the task execution logic resumed execution of the tasks in the first workflow, and to include the suspend time metric in the resumption event record.

13. The computing system of claim 12 wherein the first worker thread includes end event generator logic configured to raise an end event indicative of the task execution logic completing execution of the tasks in the first workflow and wherein the event processing logic comprises:
- end logic configured to control the time capture logic to capture a timestamp indicative of when the task execution logic completed execution of the tasks in the first workflow and to control the stack trace capture logic to capture a stack trace and to generate an end event record including the timestamp and the stack trace.

14. A computer implemented method, comprising:
- receiving a service request;
- assigning the service request a transaction identifier;
- identifying a plurality of workflows corresponding to the request, each workflow having a set of tasks to be executed to generate a response to the request;
- activating, with a first worker thread, computing subroutines to execute the tasks in a first workflow of the identified workflows;
- maintaining a runtime stack indicative of the computing subroutines that are active;
- raising a suspend event, with the first worker thread, indicative of the computing subroutines suspending execution of the tasks in the first workflow;
- raising a resume event indicative of the computing subroutines resuming execution of the tasks in the first workflow;
- detecting, at an event detector that is separate from the first worker thread, the suspend event and the resume event;
- generating control signals to capture
  - a suspend timestamp based on the suspend event;
  - a suspend stack trace;

a resume timestamp based on the resume event; and
a resume stack trace;

generating a suspended time metric indicative of a time that the first workflow was suspended based on the suspend timestamp and the resume timestamp;

controlling a data store to generate a suspend-resume event record including a thread identifier indicative of the first worker thread, the suspend timestamp, the suspend stack trace, the resume timestamp, the resume stack trace, and the suspend time metric in the suspend-resume event record; and aggregating the timestamps and the stack traces across the plurality of different workflows corresponding to the request, based on the transaction identifier to identify an end-to-end latency indicative of a time to respond to the request, based on the aggregated timestamps.

15. The computer implemented method of claim 14 wherein receiving a service request comprises:

receiving a plurality of different requests, of different request types, and wherein aggregating includes aggregating the captured timestamps and the captured stack traces across the plurality of different requests based on the request types.

16. The computer implemented method of claim 14 and further comprising:

assigning a workflow identifier to the first workflow;

raising a start event when the computing subroutines begin executing the tasks for the first workflow, the start event including the workflow identifier assigned to the first workflow;

raising an end event when the computing subroutines complete execution of the tasks in the first workflow;

controlling time capture logic to capture a start timestamp based on the start event;

controlling the data store to store a workflow-thread association between the first workflow and the worker thread that raised the start event based on the workflow identifier assigned to the first workflow;

controlling the time capture logic to capture an end timestamp based on the end event; and controlling stack trace capture logic to capture an end stack trace, based on the end event.

17. The computer implemented method of claim 14 wherein raising the suspend event includes providing an indication of whether the first workflow can be resumed on a different worker thread, different from the first worker thread, and if the suspend event included the indication that the first workflow can be resumed on a different worker thread, different from the first worker thread, then generating control signals comprises:

identifying the workflow identifier assigned to the first workflow, from the resume event; and controlling the data store to modify the workflow-thread association to indicate that the different thread, that raised the resume event, is associated with the first workflow.

18. A computing system, comprising:

at least one processor; and memory storing instructions executable by the at least one processor, wherein the instructions, when executed, configure the computing system to:

assign a received request a transaction identifier and identify a plurality of workflows corresponding to the request, each workflow having a set of tasks to be executed to generate a response to the request;

activate, using a first worker thread computing subroutines in the computing system to execute the tasks in a first workflow of the identified workflows;

store a runtime stack indicative of the computing subroutines of the computing system that are active;

raise a suspend event, with the first worker thread, indicative of the computing subroutines suspending execution of the tasks in the first workflow;

capture, in response to the suspend event, a timestamp associated with the suspend event and a stack trace of the runtime stack;

generate a suspended time metric indicative of a time that the first workflow was suspended based on the timestamp;

generate an event record including a thread identifier indicative of the first worker thread, the timestamp, the stack trace, and the suspend time metric; and aggregate the timestamps and the stack traces across the plurality of different workflows corresponding to the request, based on the transaction identifier and to identify an end-to-end latency indicative of a time to respond to the request, based on the aggregated timestamps.

19. The computing system of claim 18 wherein the request receiving logic is configured to receive a plurality of different requests, of different request types, and wherein the data aggregation logic is configured to aggregate the captured timestamps and the captured stack traces across the plurality of different requests based on the request types.

* * * * *